May 27, 1958  J. S. TAPP  2,836,181
FLEXIBLE NYLON TUBE AND METHOD FOR PREPARING SAME
Filed Jan. 17, 1955

INVENTOR
James S. Tapp
BY Roy P. Wymbs & Thomas B. Leslie
ATTORNEYS

United States Patent Office 2,836,181
Patented May 27, 1958

2,836,181

FLEXIBLE NYLON TUBE AND METHOD FOR PREPARING SAME

James S. Tapp, Decatur, Ala., assignor to The Chemstrand Corporation, Decatur, Ala., a corporation of Delaware Application January 17, 1955, Serial No. 482,191

9 Claims. (Cl. 128—334)

This invention relates to tubes for use in surgery on the vascular system, a method of preparation of such tubes, and their use in surgery. More particularly, this invention relates to tubes for the replacement and repair of damaged arteries and veins.

Human blood vessels are peculiarly tough and resilient organs. However, there are times when their replacement and repair is necessitated. Malformations from birth and damage due to traumatic injury are the most common causes necessitating such replacement. However, certain of the geriatric diseases result in breakdowns in the strength of the walls of the blood vessels and sometimes in the formation of scar tissue therein. Thus, these most vital human organs sometimes require the replacement of certain segments or portions thereof.

In the past, it has been customary for surgeons repairing traumatic damage to blood vessels to simply suture the severed ends together and to rely upon natural healing forces to effect a unitary joinder. This type of treatment has been limited, however, to cases where the traumatic injury resulted in very little damage to the walls of the blood vessels extending away from the direct point of severence. Only so much of the damaged vessel could be excised as would still allow the direct joinder of the severed ends with the inherent slack present in the vessel. It is readily apparent that only a very small portion of the vessel could be removed and the ends still approximated for surgery. In some cases, short tubes or buttons of absorbable or non-absorbable materials were employed for approximating the severed ends of the blood vessel and for support during healing. However, none of these expedients afforded a way to excise a larger portion of damaged vessel because in order for healing to take place the severed ends had to be effectively joined.

More recently surgeons have employed sections of human arteries and veins as grafts to replace excised portions of damaged blood vessels. However, this procedure requires a donor of the section to be grafted and requires extensive precautions in the preservation of the blood vessel section to be grafted. This preservation is effective for short periods only and hence a continuing supply of such members for grafts is impracticable. Moreover, blood vessels within the body are of varying sizes throughout and a section to be employed for graft must very closely match the size of the damaged portion to be replaced in order to make an effective closure and to function properly when in place. The problem of varying sizes of vessels greatly complicates attempts to employ segments or sections of human blood vessels for grafts in many cases.

An additional approach to the problem has been attempted in which tubes of tantalum foil have been fabricated for replacing damaged portions of blood vessels. However, such metallic tubes cannot be employed in many loci in the body because of a lack of flexibility inherent in their composition. The provision of flexible joinders of severed blood vessels is very necessary in many loci in order that the normal bodily activity may be accomplished both during and after the healing period. All attempts to render previous tubular replacements for blood vessels sufficiently flexible to meet this problem have been prohibited by the danger of allowing collapse and stricture of the vessel replacement portion under flexion. Therefore, the problem of a flexible blood vessel replacement section has not been adequately met under the past practice.

The present invention has for its principal object the provision of flexible tubes not subject to kinking or collapsing, composed of a non-absorbable material inert and compatible with the human body, which can be used to replace entire sections of diseased or damaged arteries or veins.

A further object of the invention is the provision of such flexible tubes in any desired diameter or length suitable for use with human arteries and veins.

A still further object is the manufacture of such tubes from a non-absorbable, compatible material in such a manner that flexibility will be imparted.

Another object is the use of such tubes in surgery for the replacement of sections of diseased or damaged arteries or veins for their permanent repair and healing.

These and other objects of the present invention are accomplished by treating a braided tube of synthetic fibers compatible with the human body in a solvent solution to stiffen and set it, then mechanically forming a circular and regular crimp or "Sylphon bellows" effect in the stiffened tube, then relaxing the crimped and stiffened tube by treatment in hot water and drying to produce a strong but flexible tube of non-absorbable and compatible material which can be securely and permanently sutured to the severed ends of arteries or veins to replace an excised portion thereof.

My invention is more completely described by the attached drawings.

My invention can be carried out with any synthetic fibers formed of material compatible with the body. My invention will be described with reference to a braided tube composed of polyhexamethylene adipamide fibers, referred to throughout this specification and the appended claims simply as nylon, though it is not limited to the use of such fibers only.

Braided nylon tubing suitable for use in my invention must be braided in such a manner as to retain its flexibility when stiffened and crimped by the treatment embraced in my invention. Any braided tube composed wholly of nylon yarn which upon treatment by my method adopts a permanent and regular crimp, fully flexible and fused so as to permanently retain sutures placed one millimeter from a severed end thereof is satisfactory. I have found that a continuous tube braided from 210 denier nylon yarn in a two and one construction having 33 picks per inch is preferable for tubes having a diameter from approximately 3/16 inch to approximately 7/16 inch. For example, a suitable braided tube may be produced in such a construction by use of a 48 carrier braiding machine using 2 ends per carrier. For diameters in the above range of 3/16 to 7/16 inch it is only necessary to substitute machines employing a greater or less number of carriers. For diameters of less than about 3/16 inch use of a lighter or lower denier yarn and a higher number of picks per inch is satisfactory. For diameters of greater than about 7/16 inch use of a heavier or higher denier yarn and a lesser number of picks per inch is preferable. Machines with the required number of carriers to achieve these results will be obvious to those skilled in the art.

When using a lower denier yarn to secure small diameter tubes, the walls of the tubes are consequently made thinner and some modification in the length and severity of the setting step by treatment in formic acid solution may be required. Conversely, when using a higher denier yarn thicker walls result and some lengthening of the treatment period or increase in the bath temperature is required. These variations can be readily determined with brief experimentation following the teachings of this disclosure.

Figure 1:
Figure 1 represents the first step in the preparation of my braided tube.

The above-described braided nylon tube is first subjected to a stiffening treatment with a concentrated aqueous solution of formic acid. The treatment is carried out as illustrated in Figure 1 with the braided nylon tube 2 mounted upon a mandrel 3 formed of some inert material such as glass or porcelain. This mandrel should be slightly smaller than the original diameter of the braided tube. The tube is mounted on the mandrel and pulled out tightly. The ends of the tube are then bound about the mandrel with cords 4 and 5 of some fiber impervious to the formic acid treatment, such as cotton. One end of the tube is then pushed back on the mandrel a distance of approximately one-half inch for each eight to ten inches of the tube which is being treated. This slack is then evenly distributed throughout the tube by running the fingers up and down it several times.

The braided nylon tube suitably mounted on an inert mandrel is then immersed in an aqueous solution of formic acid at a concentration of from about 72 to about 75 volume percent. I have found this concentration of formic acid solution to be quite critical. A concentration of greater than about 75 volume percent will result in a nylon tube much too harsh and inflexible for the purpose intended. On the other hand, a concentration of less than about 72 volume percent will result in insufficient fusion between yarns in the braided tube so that sutures placed about one millimeter back from the severed end will pull out. I have found it preferable to use a concentration of 73.4 volume percent, or 125 parts of 98 to 100 percent formic acid to 45 parts of water.

The braided nylon tube suitably mounted on an inert mandrel is immersed in a long, narrow container such as a nine to ten inch test tube filled with the concentrated aqueous formic acid solution for a period of between 15 and 25 seconds, preferably 20 seconds, at room temperature. Close control of time of immersion and the temperature of the bath has been found necessary. Therefore, when the aqueous formic acid solution for treatment is made up it has been found preferable to set it aside for a period of at least a half hour to allow it to return to ambient temperature before treating a nylon tube. A treating bath at a higher temperature than room temperature can be employed, but the period of treatment must be correspondingly shortened in order that the tube receive the same degree of stiffening treatment. When using temperatures higher than room temperature in the bath, brief experimentation will be necessary to determine the optimum time of treatment required. I have found is necessary to treat not more than two nylon tubes in a single nine to ten inch test tube of treating bath before the bath must be discarded and fresh bath employed. It would be possible to employ a bath for treating more than two tubes if a larger vessel, such as a five-liter beaker, were employed as a treating vessel if sufficient agitation were also used to maintain fresh treating solution about the nylon tubes to be stiffened. I have, however, found it preferable to employ a small diameter vessel and discard and renew the treating bath after each two tubes treated.

As soon as the stiffened nylon tube has been withdrawn from the formic acid treating bath, it should be thoroughly washed to remove all traces of the formic acid solution. I have found in my practice that washing under running tap water for at least one-half hour has been sufficient to thoroughly remove all of the treating bath present.

Figure 2:
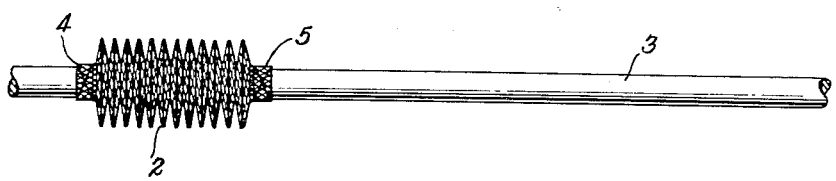
Figure 2 represents the crimped tube being heat set to retain the crimped form.

When the braided nylon tube has been sufficiently washed under running water, the tube, still mounted upon the mandrel, is removed from the water and may be superficially dried by means of an absorbent towel if desired. A regular and circular crimp illustrated in Figure 2 is then imparted to the stiffened nylon tube by a mechanical operation. This operation can consist of pushing one end of the tube 2, still retained by its original tying cords 4 and 5, along the smooth mandrel 3 until a compressed "Sylphon bellows" effect is produced. The amount of slack originally distributed throughout the tube before the treating step becomes critical at this point. If too little slack was originally left, the tube would have tightened against the mandrel so that it will not be possible to compress it easily, whereas if too much slack has been left the crimps will not be even when the tube is compressed. Likewise, a smooth and even compression of the tube is necessary to secure even crimping. This can be achieved by pushing with the fingers with the opposing end of the mandrel rested against a flat surface, or is can be achieved by various mechanical means readily apparent, such as a hand compressing tool with a flat surface carrying an aperture the size of the mandrel, or by more complex mechanical means utilizing the same flat, pierced surface.

When the smooth even crimp has been established in the stiffened tube, it is then heat set by means of treating the tube still mounted upon the mandrel in a convection oven at approximately 130° C. for a period of 30 minutes. Setting temperatures of from about 110 to about 150° C. may be employed with the period of setting suitably modified to correspond to the higher or lower temperature.

At the end of such setting period, the stiffened and crimped nylon tube and its mandrel are removed from the oven and the tube removed from the mandrel by cutting the cords which originally held it and pushing it from the mandrel. The tube will have a harsh feel. The tube will have been reduced in length to about two inches for each eight to nine inch section of the braided tube originally employed.

Figure 3:
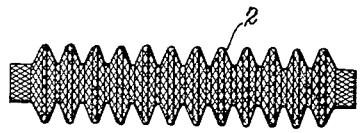
Figure 3 represents the finished tube.

The stiffened and crimped nylon tube is then relaxed to equilibrium in a bath of water at from about 90° to about 100° C. for a period of approximately five minutes. This relaxing treatment will distribute and/or dissipate all unusual strains introduced into the braided tube by the crimping operation, and the heat set crimps will then be permanently imparted to the nylon tube. At the end of the relaxing period, the tube is withdrawn from the water bath and dried, either at room temperature or in a convection oven at not more than 130° for ten minutes. After the period in the relaxing bath, the tube will have lengthened to a length of approximately four inches if starting with an eight and a half to a nine-inch section of tube, and it will have had imparted a permanent, even circular crimp, as illustrated in Figure 3.

After drying, the flexible, crimped, braided nylon tube may be suitably packaged for distribution to hospitals. The tube may be sterilized in steam at 110° C. for as long as two hours without having is physical properties adversely affected.

My new flexible, crimped nylon tube amply meets the requirements of surgery for a non-absorbable, compatible device for replacing diseased or damaged segments of blood vessels. My new tube may be sutured securely and left permanently in place in the body because it is composed entirely of nylon, a material which has been found to be fully compatible with fluids and tissues of the human body. My new tubes may be steam sterilized at 110° C. for as long as one to two hours without adversely affecting their physical properties. My new braided nylon tubes can be supplied in any length and in a multitude of diameters so that any desired size blood vessel segment may be replaced by one of my tubes.

My new nylon tubes are stiffened so that they resist deformation yet they are sufficiently flexible to be adapted to any body motion or strain without effecting the sutures at the ends. Most important, my new crimped, braided nylon tubes are not subject to kinking or collapse and stricture upon flexion of as much as 180° due to the "Sylphon bellows" configuration of its surface. My new tubes may be used in any location in the body, irrespective of the degree or frequency of flexion required, because they will retain their flexibility and resistance to kinking and collapse permanently. My new nylon tubes may be sutured directly to the severed ends of blood vessels with sutures placed not more than one millimeter back from a severed end and the sutures will not pull out under normal body stresses. Therefore, a permanent, compatible, flexible, replacement for any size or length of blood vessel may be effected by use of my braided, crimped nylon tubes.

Figure 4:
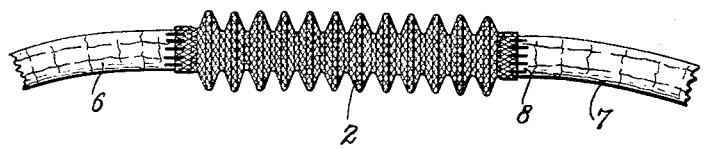
Figure 4 represents one of my finished tubes in place in the body.

Figure 4 illustrates the surgical use of my new braided tubes. The sterilized tube 2 is placed over the ends 6 and 7 of a severed blood vessel from which a diseased or damaged section has been excised. While the vessel is still clamped off the ends of the tube are sutured securely to the severed ends of the vessel with small, tight sutures 8. Upon releasing the clamps the tube is immediately sealed by clotting within the interstices of the braid and thereafter functions as a permanent replacement for the damaged section.

The source of all the desirable physical properties present in my new braided, crimped, stiffened nylon tubes is not fully understood at present. Though I do not wish to be confined to any specific theory, it is believed that the desirable properties may be attributed to the method of treatment employed. It is obvious that a much stiffer and stronger element than the original braided nylon tube is necessary in this application. It seems likely that the desirable qualities of degree of stiffness and toughness is imparted by the formic acid stiffening treatment. It has been observed that some incipient dissolution of the nylon fibers occurs during this treatment. It may therefore be theorized that the surfaces of the nylon yarns of which the braided tube is composed are sufficiently dissolved that upon removal from the treating bath they coalesce against each other into a more or less unitary structure, thus affording more stiffness and resistance to deformation to the tube and a sufficient fusion of the fibers to allow permanent suturing within one millimeter of the end of the severed tube. This conjecture has been borne out by the fact that sutures placed not more than one millimeter back from a tube severed at any point along its length cannot be pulled out under very severe stress. The braided fibers simply do not part to allow the suture to pull out. It is apparent that this is a most desirable characteristic in a permanent replacement for blood vessel sections.

It has also been theorized that the essential qualities of resistance to kinking and collapse and stricture of the interior passage has been imparted through the mechanical crimping operation conducted on the tubes. When any even, circular crimp produces a "Sylphon bellows" effect in the surface of a hollow tubular member then that member is rendered more flexible than originally and effectively resists kinking. This conjecture has been borne out by the fact that my nylon tubes can be subjected to an infinitely great number of flexions of as much as 180° without any tendency to kink or collapse being observed. The permanence and resistance to collapse imparted to the crimped surface of my nylon tubes may be attributed to the relaxation afforded by the hot water bath relaxing treatment. Such treatment, it may be conjectured, results in a dissipation of abnormal stresses imposed during the crimping operation and an intermediate, equilibrium position reached to which the stiffened, crimped, braided fibers will permanently tend to return under any degree of imposed stress.

My invention is more fully described and exemplified in the following examples. It is to be understood, however, that my invention is not to be limited to any specific form of materials, or conditions set forth in the examples, but is limited solely by the description in this specification and the appended claims.

*Example I*

A tube was braided in a two and one construction from 210 denier polyhexamethylene adipamide yarn having 33 picks per inch. The braiding was accomplished on a 48 carrier braiding machine using 2 ends per carrier, and the resulting continuous tube was approximately 5/16 inch in diameter. An eight and a half inch length was cut from this continuous braided nylon tube of approximately 5/16 inch diameter. The severed length was slipped over a 1/4 inch diameter glass mandrel nine inches long. With ordinary cotton cord, each end of the cut nylon tube was wrapped and tied securely to the mandrel. The braided tube was pulled tight on the mandrel and then one end was backed off exactly one-half inch to afford that amount of slack. The slack was uniformly distributed over the length of the tube by running the fingers two or three times over its length.

There was previously prepared an aqueous solution of 125 parts by volume of 98 percent formic acid and 45 parts by volume of distilled water. This solution was mixed well and allowed to stand for one-half hour before use. A nine-inch test tube was filled with the aqueous formic acid solution and the entire mandrel and braided nylon tube were immersed therein for precisely 20 seconds at room temperature of between 75 and 85° F. The mandrel bearing the nylon tube was then removed and immersed immediately in flowing tap water for 30 minutes. The mandrel and treated tube were removed from the tap water after 30 minutes of washing and patted superficially dry with absorbent paper. The end of the glass mandrel was then placed against a solid flat surface and with the thumb and fingers at the other end the nylon tube was skidded forward on the mandrel to produce a multitude of even crimps. The crimped tube still mounted upon the mandrel was then placed in an air convection oven at 130° C. for 30 minutes. At the end of the heat setting period, the tube and mandrel were removed from the oven and when cool the cords holding either end of the tube were cut. The tube was then removed by pushing it from the mandrel. The crimped tube was then approximately two inches long and very harsh to the touch. The crimped tube was then placed in a bath of distilled water at about 90° C. for five minutes. The braided nylon tube, now relaxed, was removed from the hot water and placed for ten minutes in a convection oven at 130° C. on a piece of blotting paper. The tube was then approximately four inches long. The braided nylon tube was extremely flexible, could be flexed to 360° in its length of four inches without any kinking or collapsing of the sides, and resisted fraying at the ends under picking with a steel needle.

*Example II*

The surgical use of a tube produced in a manner corresponding with that of Example I is described in this example. In removing an arteriovenous communication high in the groin of a middle aged man which had resulted from an old injury there was left a three-inch defect in the artery. A braided nylon tube prepared in a manner set forth in Example I above of approximately the size of the artery segment removed was employed. Since the location of the defect was high in the groin, a non-kinking prosthesis was desirable. The opposing ends of the nylon tube of three-inch length were firmly sutured to the severed ends of the artery. It was evident that blood flowed through the tube as soon as the clamps were released, since the outer surface of the tube immediately developed a pink coloration. Closure of the patient's surgical wound was thereafter effected.

Within a few hours, the patient developed an excellent pulse in the foot below the graft, had no pain in the extremity, and the foot was warm, which afforded excellent evidence that the graft was functionally satisfactory.

While a specific embodiment of the invention has been described, variations in structural detail within the scope of the claims are possible and are contemplated. Other polyamide fibers than the polyhexamethylene adipamide can be employed in my invention, such as polytetramethylene adipamide, polyhexamethylene sebacamide, and polycaprolactam. The use of such other polyamide fibers is contemplated within the scope of the claims. Fibers of acrylonitrile polymers are also compatible with the human body and can likewise be employed to produce my braided, stiffened, crimped tubes with suitable variations in the conditions of treatment. There is no intention therefore, of limitation to the exact details shown and described.

I claim:

1. A flexible device for blood vessel replacement not subject to kinking or collapse which comprises a braided nylon tube stiffened by treatment with a concentrated formic acid solution, having a regular, circular crimp mechanically induced and rendered permanent by heat treatment, and having the said crimp relaxed by a treatment in hot water and dried.

2. The method of manufacturing a flexible device not subject to kinking or collapse which comprises stiffening a braided nylon tube by treatment with a concentrated aqueous solution of formic acid, washing off any retained formic acid solution, mechanically forming a regular series of annular crimps in the stiffened tube, heat setting the thus formed annular crimps relaxing to equilibrium the heat set crimps by treatment with hot water, and drying the flexible crimped tube.

3. The method according to claim 2 wherein the tube is treated with an aqueous solution of formic acid of from 72 to about 75 volume percent.

4. The method according to claim 3 wherein the tube is treated with the aqueous formic acid solution for from about 15 to about 25 seconds at room temperature.

5. The method according to claim 2 wherein the series of annular crimps is mechanically formed by compressing the treated tube on a mandrel.

6. The method according to claim 2 wherein the series of annular crimps is heat set by exposure in a convection oven at about 130° C. for approximately 30 minutes.

7. The method according to claim 2 wherein the series of heat set crimps is relaxed to equilibrium by treating with water at a temperature from about 90° to about 100° C. for approximately five minutes.

8. A flexible crimped tube not subject to kinking or collapse which comprises a dried, formic acid stiffened, braided nylon tube having a regular series of heat set and subsequently relaxed annular crimps.

9. A flexible tube comprising a formic acid stiffened, braided nylon tube having a series of regular and permanent annular crimps which prevent kinking and collapsing of the tube under flexion.

References Cited in the file of this patent

OTHER REFERENCES

Plastic Tubes Used as Blood Vessels, article from the Washington Post of January 11, 1952, p. 13, #27, 602.

Voohees, Jr., et al.: "The Use of Tubes Constructed From Vinyon 'N' Cloth in Bridging Arterial Defects," Annals of Surgery, vol. 135, No. 3, March 1952, pp. 332–336.